United States Patent

[11] 3,576,568

| [72] | Inventor | Rene Thirion |
| | | Paris, France |
| [21] | Appl. No. | 711,396 |
| [22] | Filed | Mar. 7, 1968 |
| [45] | Patented | Apr. 27, 1971 |
| [73] | Assignee | Societe Anonyme DBA |
| [32] | Priority | May 17, 1967 |
| [33] | | France |
| [31] | | 99310 |

[54] WARNING DEVICE FOR A BRAKING SPLIT SYSTEM
3 Claims, 5 Drawing Figs.

[52] U.S. Cl. ............................................. 340/60,
200/81.5, 340/66, 340/71
[51] Int. Cl. ........................................ B60q 1/44,
F16d 66/00, H01h 35/24
[50] Field of Search............................... 200/81,
81.4, 81.5, 82.3, 83.2, 83.4; 340/52, 60, 69, 71, 66

[56] References Cited
UNITED STATES PATENTS
| 1,555,074 | 9/1925 | Poque | (340/80UX) |
| 2,118,125 | 5/1938 | Wells | 200/82.3 |
| 2,450,961 | 10/1948 | Heymann et al. | 200/81.4 |
| 2,857,584 | 10/1958 | Gibson | 340/60 |
| 3,011,595 | 12/1961 | Heiss et al. | 340/52(C)X |
| 3,439,322 | 4/1969 | Gardner | 340/69X |

*Primary Examiner*—John W. Caldwell
*Assistant Examiner*—Kenneth N. Leimer
*Attorneys*—W. N. Antonis and Plante, Arens, Hartz and O'Brien ABSTRACT: A combination stop warning switch and brake system failure indicator switch is disclosed for use on automotive vehicles having split braking systems. When the brakes function normally, the switch actuates the vehicle's stop warning system when the vehicle's brakes are applied. However, if a malfunction causes the pressure in one of the brake systems to exceed the pressure in the other system by more than a predetermined amount during a brake application, the switch actuates both the stop warning system and a warning device in the vehicle's operator's compartment.

PATENTED APR 27 1971

INVENTOR
RENÉ THIRION
BY-
Richard G. Geib
ATTORNEY

INVENTOR
RENÉ THIRION

WARNING DEVICE FOR A BRAKING SPLIT SYSTEM

This invention relates to a warning device for a braking split system adapted to provide a readily noticeable indication of the braking actuation of the vehicle and to indicate a failure occuring in one of the independent braking circuits.

The prior know devices have been suggestive of stop warning devices comprising a manometrical contactor provided to close an electrical circuit upon the braking operation.

The prior devices have been also suggestive of failure warning devices comprising a manometrical contactor provided to close an electrical circuit in the event of a pressure drop in one of the independent braking circuits.

It is therefore a principal object of this invention to associate these two warning devices in a same housing, so as to obtain a compact, improved and cheap assembly, allowing to reduce substantially the wiring and the number of the parts used, by an appropriate arrangement of the different parts and the hydraulical and electrical conduits.

The warning device according to the invention is adapted to energize a first electrical circuit controlling a stop indication means upon a normal braking operation and then a second electrical circuit controlling a failure indicating means in the event of a failure occurring in one of the two circuits of said split braking system, said warning device being characterized in that it comprises two pressure responsive movable elements responsive to the braking pressures in said two circuits respectively and operative to close a first electrical contact means connected to control said first electrical circuit when the braking pressure in said two circuits is above a predetermined value, said pressure responsive elements being adapted to cooperate with a motion transmitting member operatively connected to be actuated by one of said pressure responsive members to close a second electrical contact means connected to control said second electrical circuit, when the differential pressure between the two circuits is above a second predetermined value.

It is obvious that with such a device, the number of the different parts and more particularly the number of the pressure responsive members and electrical contact means are substantially reduced. The invention provides a device having a better operation and an improved safety when compared to the known devices.

The electrical circuits of the device could advantageously be connected to indicating lights or to buzzers, so as red stop lights provided at the rear of the vehicle and signal lights provided on the instrument board.

Other features and advantages of the invention will appear from the following description referring to the accompanying drawings wherein.

Figure 1:
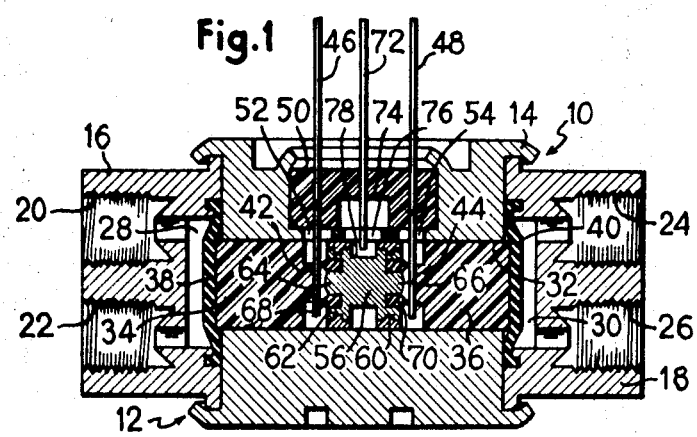
FIG. 1 shows a cross-sectional view of a first embodiment of a warning device according to the invention.

Referring to FIG. 1, reference number 10 designates a warning device comprising a tubular housing 12 electrically grounded provided with a body 14 to which are fitted two connecting members 16 and 18. These latter are provided with inlet ports 20 and 24 each of which being connected to one of two independent braking systems, supplied with pressurized fluid by a split-type master cylinder, for instance. Each of the connecting members 16 and 18 is provided likewise with an outlet port 22 and 26 connected to one of the front or the rear wheel cylinders, for instance. The ports 20, 22 and 24, 26 are communicating with front 28 and rear 30 chambers respectively. The body 14 is provided with a bore 32 wherein two pressure responsive members or pistons 34 and 36 are slidingly mounted. The bore 32 is sealed from the chambers 28 and 30 by means of diaphragms 38 and 40 the peripheral portion of which is operatively secured between the body 14 and the connecting members 16 and 18 respectively. Pistons 34 and 36 are advantageously formed in an insulating material such as bakelite. The facing sides of pistons 34 and 36 are provided with abutments 42 and 44 respectively cooperating with electrical contact means or electrical leads 46 and 48 connected to the terminal plus of the battery and to an indicating light or buzzer such as the red stoplight of the vehicle respectively. The leads 46 and 48 pass through a piece of an insulating material 50 and through ports 52 and 54 provided on the body 14. These latter must be wide enough to allow a clearance to leads 46 and 48 without any risk of contacting the sides of the ports 52 and 54. A contacting member 56, slidingly received in the bore 32 between the two pistons 34 and 36 is provided with two peripheral grooves 62, each of which receiving a seal 60 made of rubber for instance, to prevent any jamming of the member 56 in the bore 32. The member 56 is further provided at the two end portions thereof, with two abutments 64 and 66 respectively maintained out of contact from the leads 46 and 48 by means of insulating resilient means 68 and 70, made of rubber for instance. An electrical contact means or lead 72 passes through the piece 50, a recess 74 provided on the latter, a port 76 provided on the body 14 and protrudes in a peripheral groove 78 of the member 56. Recess 74, port 76 and groove 78 are wide enough to allow a clearance to lead 72 without any risk of accidental contact with their respective sides. Lead 72 is connected to an indicating light or a buzzer, for instance, a signal lamp provided on the instrument board of the vehicle.

Member 56 could be formed in an insulating material and provided with contact studs on the abutments 64 and 66 and on the internal faces of the groove 78 so as to cooperate with leads 46, 48 and 72 respectively.

The operation of the device as hereinabove described is as followed: The driver actuates the master cylinder to supply with independent pressures, chambers 28 and 30 through ports 20 and 24, and the brakes of the vehicle through ports 22 and 26. Pistons 34 and 36 which are normally out of contact of the abutments 64 and 66 i.e. when there is no pressure, are urged toward one another by the action of the pressures in chambers 28 and 30. When the pressure reaches a predetermined value, pistons 34 and 36 compress the resilient means 68 and 70 urging leads 46 and 48 in engagement with the conducting abutments 64 and 66 and closing thus a first electrical circuit comprising the lead 46, member 56, lead 48, the red stop light of the vehicle signalizing the actuation of the brakes and the battery.

Upon a drop of pressure occuring in one of chambers 28 or 30, due to a leakage in one of the separate braking systems, the pressure differential created between the chambers entails the displacement of piston 34, piston 36 and the conducting member 56 as a unit. For instance, if the pressure drops in chamber 28, pistons 34 and 36 being urged toward the left, when considering FIG. 1, against the resilient means 68 and 70, leads 46 and 48 come first in engagement with their respective conducting abutment 64 and 66 closing thus the first electrical circuit to signalize the actuation of the rear brakes. Piston 36 carries out the member 56 in its movement toward the left, and the internal right side of the groove 78 engages the lead 72, closing thus a second electrical circuit comprising lead 48, member 56, lead 72 and the signal lamp provided on the instrument board to signalize a failure in one of the two braking circuits.

Figure 2:
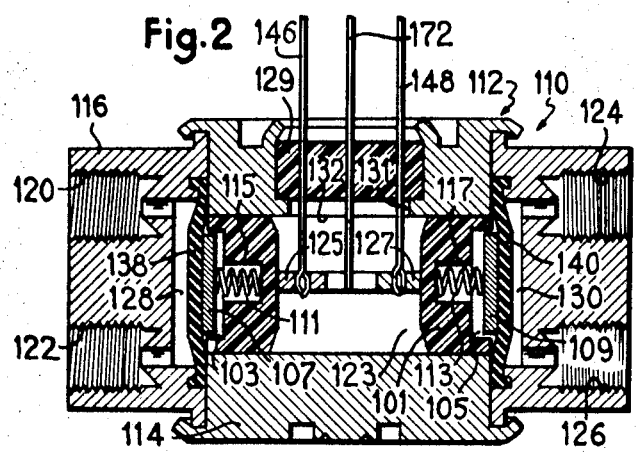
FIG. 2 is a cross-sectional view of another embodiment of the warning device.
Figure 3:
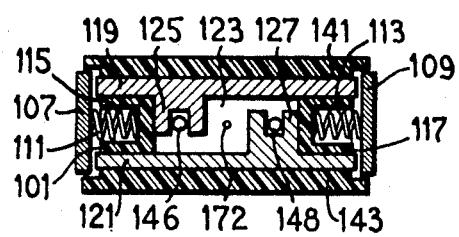
FIG. 3 illustrates a cross-sectional view of the central part of the warning device shown in FIG. 2 along a plane perpendicular to the sheet and parallel to the axis of the warning device.

FIGS. 2 and 3 show another embodiment of the warning device. The elements similar to those of FIG. 1 have the same numeral reference added 100.

The warning device 110 is provided with a pressure responsive member or piston 101 is slidingly received in a bore 132. Piston 101 is provided at its end portions with recesses 103 and 105 respectively, each of which receiving electrical contact terminals 107 and 109 respectively urged toward pressure responsive diaphragms 138 and 140 by resilient means as springs 111 and 113 which take abutment on the bottom recesses 115 and 117 respectively provided on piston 101. Piston 101 is formed advantageously in a piece of an insulating material, bakelite for instance and is provided with axial grooves 141 and 143 which receive two leads or plates 119 and 121 respectively, maintained out of contact from terminal 107 and 109 by means of springs 111 and 113. Piston 101 is likewise provided with a central groove in which are located electrical contact means or terminals 125 and 127 provided on the plates 119 and 121. Leads 146 and 148 are connected to terminal plus of the battery and to the red stop light of the vehicle respectively, and are fixed by welding to said terminals 125 and 127. These latter enframe an electrical contact element or lead 172 connected to a signal lamp provided on the instrument board. Leads 146, 148 and 172 pass through a wide port 131 provided on the body 114 and through a piece of an insulating material 129, bakelite or nylon for instance. Piston 101 could be made of two separate members.

The operation of the device as described hereinabove is substantially the same than the device of FIG. 1: when there is no pressure, the terminals 107 and 109 are maintained out of contact of the plates 119 and 121 by means of the springs 111 and 113, respectively as represented on FIG. 2. Upon the braking operation, the independent pressures in chambers 128 and 130 exert on each of the diaphragms 138 and 140 a force which urges the terminals 107 and 109 toward the plates 119 and 121 respectively. When the two pressures reach a predetermined value sufficient to overcome the force of springs 111 and 113, terminals 107 and 109 engage the plates 119 and 121, closing then a first electrical circuit comprising a red stop light signalizing the actuation of the brakes.

If the braking systems are balanced, piston 101 does not move and the terminals 125 and 127 remain out of contact of the lead 172. If a failure occurs, in one of the braking systems, piston 101 moves. For instance, if the pressure drops in chamber 130, the terminal 107 comes first in engagement with the plates 119 and 121 closing thus the first electrical circuit adapted to signalize the actuation of the front brakes. Piston 101 moves then toward the right, when considering FIGS. 2 and 3, and the terminal 125 contacts the lead 172, closing thus a second electrical circuit adapted to energize the signal lamp of the instrument board so as to signalize the failure.

Figure 4:
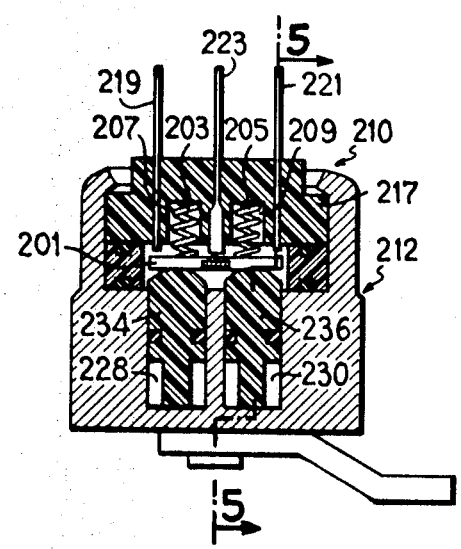
FIG. 4 is a cross-sectional view of another embodiment of the warning device.
Figure 5:
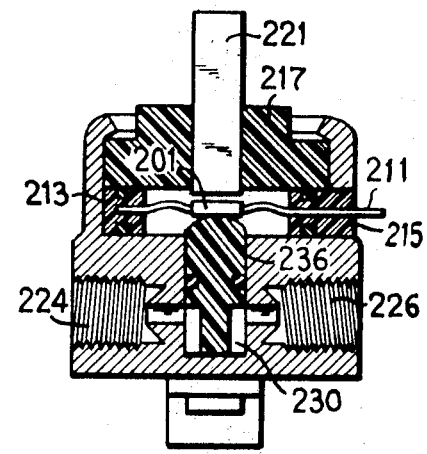
FIG. 5 is a cross-sectional view of the warning device of FIG. 4 on the line 5—5.

FIGS. 4 and 5 represent a third embodiment of the warning device. The elements similar to those of FIG. 1 have the same numeral reference added 200.

The warning device 210 is comprised of two pistons 234 and 236 made of insulating material slidingly received in two chambers 228 and 230 supplied with one of two independent pressures respectively. Pistons 234 and 236 cooperate with an electrical contact member or conducting lead 201 connected to the terminal plus of the battery, and operatively urged toward pistons 234 and 236 by means of springs 203 and 205 respectively taking abutment on the bottom of recesses 207 and 209 respectively provided in an insulating piece 217. The lead 201 is connected to a lead 211 which passes through insulating pieces 213 and 215. The piece 217 is crossed by three leads 219, 221 and 223 connected to a rear signal lamp of the instrument board, a front signal lamp of the instrument board and the red stop light of the vehicle respectively. The lead 201 is more spaced from leads 219 and 221 than from lead 223, so as to create thus a tilting effect round lead 223 when the forces of springs 203 and 205 are overcome upon a pressure drop occuring in one of the braking systems, this structure preventing from any risk of accidental contact between the lead 201 and leads 219 and 221 upon a braking operation without pressure drop.

The device as described hereinabove actuates as following: assuming there is no pressure drop, as represented in FIGS. 4 and 5, the lead 201 is maintained out of contact of leads 219, 221 and 223 by means of springs 203 and 205. Upon the braking operation, pistons 234 and 236 being moved upwardly, carry out in this movement the lead 201 to come in engagement with the lead 223 closing thus a first electrical circuit adapted to light red stop light to signalize the braking operation.

If a failure occurs, one of the two pistons only moves, piston 236 for instance, carrying out the lead 201 to engage first the lead 223 so as to close the first electrical circuit to signalize the braking operation, and then tilting the lead 201 round the lead 223 to contact the lead 221, closing thus a second electrical circuit adapted to light the front signal lamp of the instrument board to signalize thus the failure occuring in the front braking system.

If a failure occurs in the rear braking system, the lead 219 is engaged by the lead 201, so as to close an electrical circuit adapted to switch on the rear signal lamp of the instrument board to signalize this failure.

It will be understood that the invention is susceptible to a variety of changes and modifications without departing from the scope and spirit of the appended claims.

I claim:

1. A vehicle hydraulic braking system having first and second hydraulic systems, a stop warning system, and a warning system for indicating a pressure differential between said first and second hydraulic system, said breaking system including:

a housing defining a bore therewithin;

first and second piston means slidable in said bore;

said first and second piston means defining first and second fluid chambers between one end of the first or second piston means and a corresponding end of the bore;

said first and second chambers being in fluid communication with said first and second hydraulic systems respectively;

third piston means slidably disposed in said bore between said first and second piston means;

first and second relatively movable switch contacts operatively connected to said stop warning system for actuating the latter;

one of said first or second switch contacts projecting into said bore between one of said first or second piston means and said third piston means;

the other of said first or second switch contacts projecting into said bore between the other of said first or second piston means and said third piston means; and a third switch contact operatively connected to said pressure differential warning system and projecting into said bore;

said first and second piston means forcing each of said first and second switch contacts into a position establishing an electrically conductive path between the first and second contacts through said third piston means when the vehicle's brakes are applied and the fluid pressure levels in said first and second chambers are substantially equal to actuate the vehicle's stop warning system;

one of said first or second piston means driving a corresponding one of said first or second switch contacts into electrically conductive engagement with said third piston means and thereafter shifting said third piston means into electrically conductive engagement with said third switch contact to actuate the vehicle's pressure differential warning system when the vehicle's brakes are applied and the fluid pressure level in the corresponding one of said chambers exceeds the pressure level in the other chamber by a predetermined amount.

2. The invention of claim 1; and electrically insulative resilient means carried by said third piston means yieldably biasing said first and second switch contacts away from the third piston means;

said first and second piston means forcing a corresponding one of said first or second contacts against the piston means upon actuation of the vehicle's brakes and substantially equal fluid pressure levels in said chambers;

one of said first or second piston means forcing a corresponding one of said first or second switch contacts against said third piston means and thereafter forcing the latter against said third contact when the vehicle's brakes are actuated and the fluid pressure level in the corresponding one of said chambers exceeds the pressure level in the other chamber by a predetermined amount.

3. The invention of claim 1:
said third piston means having a recess provided in the outer surface thereof;
said third switch contact projecting into said recess.